July 12, 1932.  R. T. SALSBURY  1,866,673
BOTTLE FILLER AND CAPPER
Filed April 29, 1930
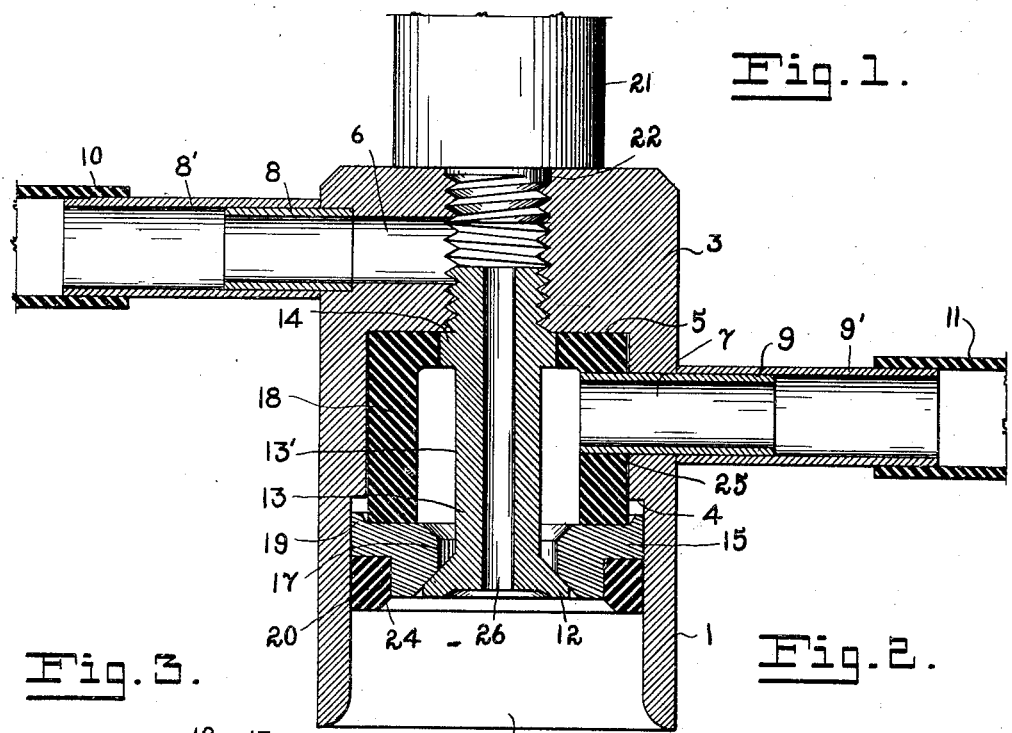
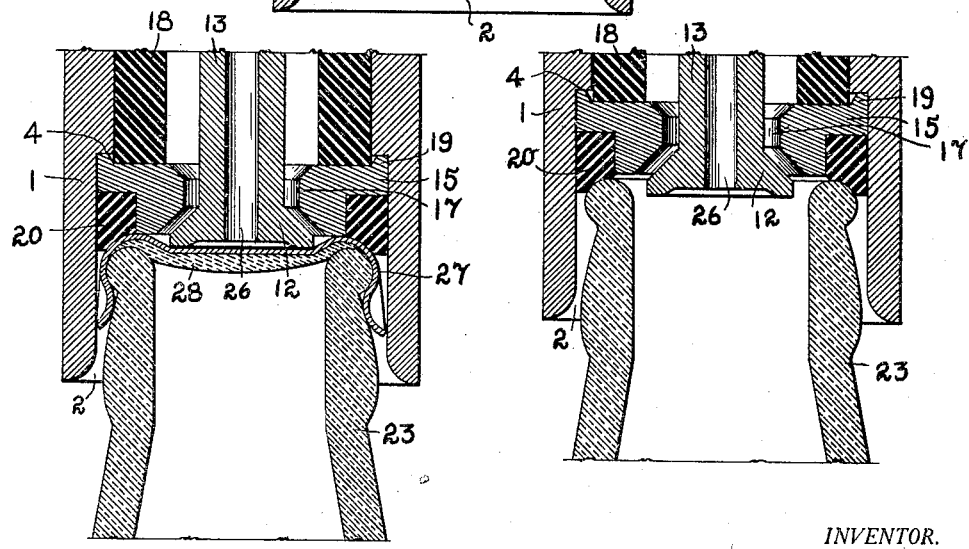
*INVENTOR.*
Ralph T. Salsbury.
BY Baldwin Vale
*ATTORNEY.*

Patented July 12, 1932

1,866,673

UNITED STATES PATENT OFFICE

RALPH T. SALSBURY, OF OAKLAND, CALIFORNIA

BOTTLE FILLER AND CAPPER

Application filed April 29, 1930. Serial No. 448,224.

This invention relates to bottle fillers and cappers, and more particularly to a combined filler and capper.

Among the objects of this invention is to provide means for filling and venting bottles in such a manner that the contents will not foam or regurgitate.

Another object is to combine with such a filler, means for clinching "crown" and similar caps on the filled bottles.

A still further object is to minimize the contact of the liquid with the metal parts of the filler. This is accomplished by a rubber sleeve in the interior of the outer shell, which prevents the liquid from contacting the shell.

Other objects and advantages will appear as the description progresses.

In this specification and the accompanying drawing the invention is disclosed in its preferred form. But it is to be understood that it is not limited to this form because it may be embodied in other forms. It is also to be understood that in and by the claims following the description it is desired to cover the invention in whatsoever form it may be embodied.

In the one sheet of drawing:

Fig. 1 is a vertical section of a combined filler and capper constructed in accordance with this invention.

Fig. 2 is a fragmentary similar view of the same showing the filler in position on the mouth of a bottle.

Fig. 3 is a similar view after the capping operation is completed.

In detail the construction illustrated in the drawing, referring to Fig. 1, comprises the outer shell 1, having the chamfered opening 2 at the bottom. Its upper portion or head 3 has a threaded central opening therethrough into the opening 2. There is an intermediate shoulder 4 formed within the opening 2 below the underside of the head 3.

The vent opening 6 is formed laterally through the head 3. The filler opening 7 is formed laterally in the shell below the head 3. The tubes 8 and 9 are fixed in the vent and filler openings and are telescoped within the nipples 8' and 9' to which are attached the rubber tubes 10 and 11, respectively.

The valve 12 has the stem 13, the upper end of which is enlarged to form a shoulder 14 and threaded to engage the threaded center hole in the head 3. It has a lower reduced portion above the tapered valve 12.

The valve block 15 slides freely within the opening 2 and bottoms against the shoulder 4.

The cylindrical resilient rubber sleeve 18 seats on the valve block 15 within the flange 19 and expands against the underside 5 of the head 3.

The valve is provided with an annular notch in its outer edge to receive the yielding "rubber" guide and gasket 20 slidable within the opening 2.

The block 15 is centrally bored at 17 to a greater diameter than the reduced portion 13' of the valve stem 13.

The block 15, the gasket 20, and the resilient sleeve 18 are assembled on the valve stem 13 before it is screwed into the head 3. The expansion of the resilient sleeve 18 keeps the valve block 15 normally seated against the valve 12.

The plunger 21 of the conventional capping machine has the threaded stud 22 screwed into the center opening in the head 3.

The invention operates substantially as follows:

The bottle is set on the base of the capper, not shown. The neck 23 extends up into the opening 2, wherein it is centered by the beveled edge 24 of the gasket 20. The plunger 21 is then depressed, which forces the gasket tightly against the outer edge of the mouth of the bottle.

Further pressure upon the plunger 21 lifts the valve block 15 against the tension of the resilient sleeve 18, unseating the valve 12. The liquid flows through the tube 11 and hole 25 in the sleeve 18, through the bore 17, and past the valve 12.

The flare of the valve 12 directs the liquid against the sides of the neck 23, down which it flows, filling the bottle. The air impounded in the bottle escapes upward through the center of the neck and through the center opening 26 in the valve stem and out through the tube 10.

It is a fact that certain foaming beverages, if poured against the inside of the bottle, will not foam in bottle filling and will not regurgitate if the impounded air can freely escape centrally.

If the bottle is to be filled by siphoning through the tube 11, the siphon is readily started by suction on the tube 10. The flow from the tube 11 cannot rise to the tube 10 but descends into the bottle. The suction may be applied by the operator applying his mouth to a convenient length of the tube 10, or by means of an exhaust bulb applied in the tube length 11.

When the bottle is filled the pressure on the plunger 21 is released, which permits the valve block 15, to descend, closing the valve 12. The flow through the tube 11 may also be stopped by a suitable pinch or other valve in the tube 11.

A crown cap 27 is then placed over the mouth of the bottle. The plunger 21 is then depressed, which forces the valve block 15 down against the top of the cap, carrying it down against the top of the bottle. Simultaneously, the end of the valve 12 descends and depresses the center of the cap 27, to cause it to seat concentrically on the rim of the mouth of the bottle, insuring a perfect fit of the gasket 28, hermetically sealing the bottle. (See Fig. 3.) The crown cap is fixed in the usual manner by the opening 2, which contracts the fluted skirt of the cap under the bead forming the top of the bottle. The plunger 21 is again raised and the operation of filling and capping is complete.

While the attachment of this device to the conventional capper plunger is desirable, it is obvious that either pressure means or pounding on the head 3 would accomplish the capping operation.

Having thus described this invention, what I claim and desire to secure by Letters Patent is:

1. A bottle filler and capper comprising a shell having a closed head and a chamfered opening adapted when forced thereon to crimp a bottle cap and having a filler inlet therein and a vent therefrom; and a valve within said shell below said inlet.

2. A bottle filler and capper comprising a shell having a closed head and a chamfered opening adapted when forced thereon to crimp a bottle cap and having a filler inlet therein and a vent therefrom; a valve having a hollow stem fixed in said head and open to said vent; and a valve block slidably sealed in said shell and engaging said valve.

3. A bottle filler and capper comprising a shell having a closed head and a chamfered opening adapted when forced thereon to crimp a bottle cap and having a filler inlet therein and a vent therefrom; a valve having a hollow stem fixed in said head and open to said vent; a valve block slidable in said shell; a resilient sleeve interposed between said block and said head; and a gasket on said block slidably engaging said shell, and adapted to engage the mouth of a bottle inserted in said shell.

4. A bottle filler and capper, comprising a shell having a closed head and a chamfered opening adapted when forced thereon to clinch a bottle cap and having a filler inlet therein and a vent therefrom; a valve having a hollow stem fixed in said head and open to said vent; a valve block slidable in said shell, and a resilient sleeve interposed between said block and said head and encircling the interior of said shell.

5. A bottle filler comprising a shell having a vented head, an internal shoulder and a side inlet; a resilient sleeve within said shell; a valve block slidable in said shell beneath said shoulder against said sleeve and having a downwardly flaring valve seat in its under side and a valve fitting said seat and having a hollow stem fixed in said head.

In testimony whereof I have hereunto set my hand this 24th day of April, 1930.

RALPH T. SALSBURY.